United States Patent
Aspin et al.

(10) Patent No.: US 11,725,103 B2
(45) Date of Patent: Aug. 15, 2023

(54) CURABLE RESIN COMPOSITION AND FIBER REINFORCED RESIN MATRIX COMPOSITE MATERIAL

(71) Applicant: Cytec Industries Inc., Princeton, NJ (US)

(72) Inventors: Ian Aspin, Derbyshire (GB); Nicolas Dreuilles, Nottingham (GB); Jonathan Meegan, Chester (GB)

(73) Assignee: Cytec Industries Inc., Princeton, NJ (US)

( * ) Notice: Subject to any disclaimer, the term of this patent is extended or adjusted under 35 U.S.C. 154(b) by 369 days.

(21) Appl. No.: 16/753,434

(22) PCT Filed: Oct. 5, 2018

(86) PCT No.: PCT/US2018/054662
§ 371 (c)(1),
(2) Date: Apr. 3, 2020

(87) PCT Pub. No.: WO2019/074795
PCT Pub. Date: Apr. 18, 2019

(65) Prior Publication Data
US 2020/0317909 A1    Oct. 8, 2020

Related U.S. Application Data

(60) Provisional application No. 62/569,856, filed on Oct. 9, 2017.

(51) Int. Cl.
| | | |
|---|---|---|
| C08G 59/18 | (2006.01) |
| C08L 63/00 | (2006.01) |
| B29B 11/10 | (2006.01) |
| B29B 11/16 | (2006.01) |
| B29C 70/32 | (2006.01) |
| C08J 5/24 | (2006.01) |
| B29K 63/00 | (2006.01) |
| B29K 105/08 | (2006.01) |

(52) U.S. Cl.
CPC .............. *C08L 63/00* (2013.01); *B29B 11/10* (2013.01); *B29B 11/16* (2013.01); *B29C 70/32* (2013.01); *C08J 5/243* (2021.05); *B29K 2063/00* (2013.01); *B29K 2105/0872* (2013.01); *C08J 2363/00* (2013.01); *C08J 2447/00* (2013.01)

(58) Field of Classification Search
CPC ........ C08L 51/04; C08L 63/00; C08G 59/186
See application file for complete search history.

(56) References Cited

U.S. PATENT DOCUMENTS

| | | |
|---|---|---|
| 2,890,194 A | 6/1959 | Phillips et al. |
| 5,629,379 A | 5/1997 | Harper |
| 5,962,586 A | 10/1999 | Harper |
| 2015/0284562 A1* | 10/2015 | Feng ........................ C08J 5/04 523/427 |

FOREIGN PATENT DOCUMENTS

| | | |
|---|---|---|
| WO | 2009089145 A1 | 7/2009 |
| WO | 2014071576 A1 | 5/2014 |

* cited by examiner

*Primary Examiner* — Jeffry H Aftergut
(74) *Attorney, Agent, or Firm* — Osha Bergman Watanabe & Burton LLP

(57) ABSTRACT

A curable resin composition contains a curable resin that comprises at least one non-aromatic epoxy compound, at least one non-aromatic oxetane compound, or a mixture thereof, one or more curing agents selected from Lewis acid:Lewis base complexes, and a cure accelerating amount of one or more anhydride compounds. A method accelerating the cure of a curable resin composition, comprising adding a cure accelerating amount of one or more anhydride compounds to a curable resin composition comprising a curable resin that comprises at least one non-aromatic epoxy compound or non-aromatic oxetane compound and a curing agent that comprises one or more Lewis acid-base complexes. The composition and method are useful in making fiber reinforced resin matrix composite articles.

20 Claims, 4 Drawing Sheets

CURABLE RESIN COMPOSITION AND FIBER REINFORCED RESIN MATRIX COMPOSITE MATERIAL

CROSS-REFERENCE TO RELATED APPLICATIONS

The present application is a U.S. national phase entry under 35 U.S.C. § 371 of International Application No. PCT/US2018/054662, filed on 5 Oct. 2018, which claims priority to U.S. provisional application No. 62/569,856, filed on 9 Oct. 2017, the entire content of each of these applications is incorporated herein by reference.

FIELD OF THE INVENTION

This invention relates to a curable resin, fiber reinforced resin matrix composite materials comprising fibers and the curable resin, and fiber reinforced resin matrix composite articles made thereby.

BACKGROUND OF THE INVENTION

Carbon and/or glass reinforced carbon fiber composite materials are used in high performance applications, e.g., in aerospace and automotive applications, where lightweight high performance are required.

The automotive industry has used fiber reinforced composites (FRC) for parts of automobiles, especially high performance cars, and trucks for many years. The use of high speed manufacturing technologies allows carbon fiber reinforced plastic (CFRP) composite materials to move into serial production vehicles. One such technique is rapid cure press moulding. The substrates used in this process could be from prepreg or from filament wound materials. In the latter, tows of carbon fiber, either pre-impregnated with resin or, more commonly, impregnated in-line, are wound around a rotating mandrel. As the winding head is moved back and forth along the mandrel, it allows a variety of woven articles with numerous interlocking angles to be constructed. The removal of the fiber reinforced resin matrix composite material from the mandrel creates rectangular "blanks" that can be used as the substrates for rapid press curing in a similar way to prepreg materials.

SUMMARY OF THE INVENTION

In a first aspect, the present invention is directed to a curable a curable resin composition, comprising:
(a) a curable resin that comprises at least one non-aromatic epoxy compound, at least one non-aromatic oxetane compound, or a mixture thereof,
(b) one or more curing agents selected from Lewis acid:Lewis base complexes, and
(c) a cure accelerating amount of one or more anhydride compounds.

In one embodiment of the resin composition, the at least one non-aromatic epoxy compound comprises at least one epoxide group per molecule of such compound, the at least one non-aromatic oxetane compound comprises at least one oxetano group per molecule of such compound, the one or more anhydride compounds each comprise at least one anhydride group per molecule of such compounds and the resin composition comprises:
an amount of the one or more curing agents effective to provide a ratio of from 1:25 to 1:2, preferably from 1:20 to 1:5, of molar equivalents of Lewis acid:Lewis base complex to molar equivalents of epoxide groups, oxetano groups, or mixture of such groups, and
an amount of the one or more anhydride compounds effective to provide a ratio of up to 1:1, preferably from 1:20 to 1:1, of molar equivalents of anhydride groups to molar equivalents of the Lewis acid:Lewis base complex component of the resin composition.

In another embodiment, the curable resin composition comprises:
(a) a curable resin comprising at least one non-aromatic epoxy compound that comprises at least one epoxide group per molecule of such compound, at least one non-aromatic oxetane compound that comprises at least one oxetano group per molecule of such compound, or a mixture of such compounds,
(b) one or more curing agents selected from Lewis acid:Lewis base complexes, in an amount of from 1 to 20 parts by weight of the one or more curing agents per 100 parts by weight of the resin composition, and
(c) one or more anhydride compounds, each comprising at least one anhydride group per molecule of such compound, in a cure accelerating amount of less than 0.5 molar equivalents of anhydride groups per molar equivalents of epoxide groups, oxetane groups, or mixture thereof.

In another embodiment, the anhydride compound is an anhydride polymer or oligomer having a molecular weight of greater than or equal to about 500 g/mole and having one or more anhydride functional group per molecule.

In a second aspect, the present invention is directed to a method accelerating the cure of a curable resin composition, comprising adding a cure accelerating amount of one or more anhydride compounds to a curable resin composition comprising a curable resin that comprises at least one non-aromatic epoxy compound, at least one non-aromatic oxetane compound, or a mixture thereof, and a curing agent that comprises one or more Lewis acid-Lewis base complexes.

The accelerated cure makes to possible to fully cure the resin composition of the present invention at a lower temperature, typically a temperature of greater than or equal to 60° C., more typically of from 100° C. to 180° C., and even more typically of from 120° C. to 160° C., for a shorter time period, typically a time period of less than or equal to 20 minutes, more typically of from 1 to 15 minutes, and even more typically of from 1 minute to 10 minutes, without requiring a post cure, compared to analogous resin compositions that lack either the one or more Lewis acid-Lewis base complexes or the one or more anhydride compounds.

In a third aspect, the present invention is directed to a method for toughening a cured resin composition, comprising adding a cure accelerating amount of one or more polymeric anhydride compounds to a curable resin composition comprising a curable resin that comprises at least one non-aromatic epoxy compound, at least one non-aromatic oxetane compound, or a mixture thereof, and a curing agent that comprises one or more Lewis acid-base complexes, in the substantial absence of any other polymeric toughening agent.

The curable resin composition is capable of being rapidly cured at moderate temperature. In one embodiment, the resin composition exhibits a high degree of cure conversion, as measured by DSC (residual enthalpy), of typically greater than or equal to 85%, more typically greater than or equal to 90%, and even more typically greater than or equal to 95%, and high glass transition temperature, as measured by DMA (storage modulus transition), typically greater than or equal to 210° C., more typically greater than or equal to 215° C., and even more typically greater than or equal to 220° C., as well as good mechanical strength, after curing at a temperature of greater than or equal to 60° C., more typically of from 100° C. to 180° C., and even more typically of from 120° C. to 160° C., for a time period of less than or equal to 20 minutes, more typically of from 1 to 15 minutes, and even more typically of from 1 minute to 10 minutes.

DETAILED DESCRIPTION OF INVENTION AND PREFERRED EMBODIMENTS

Figure 1:
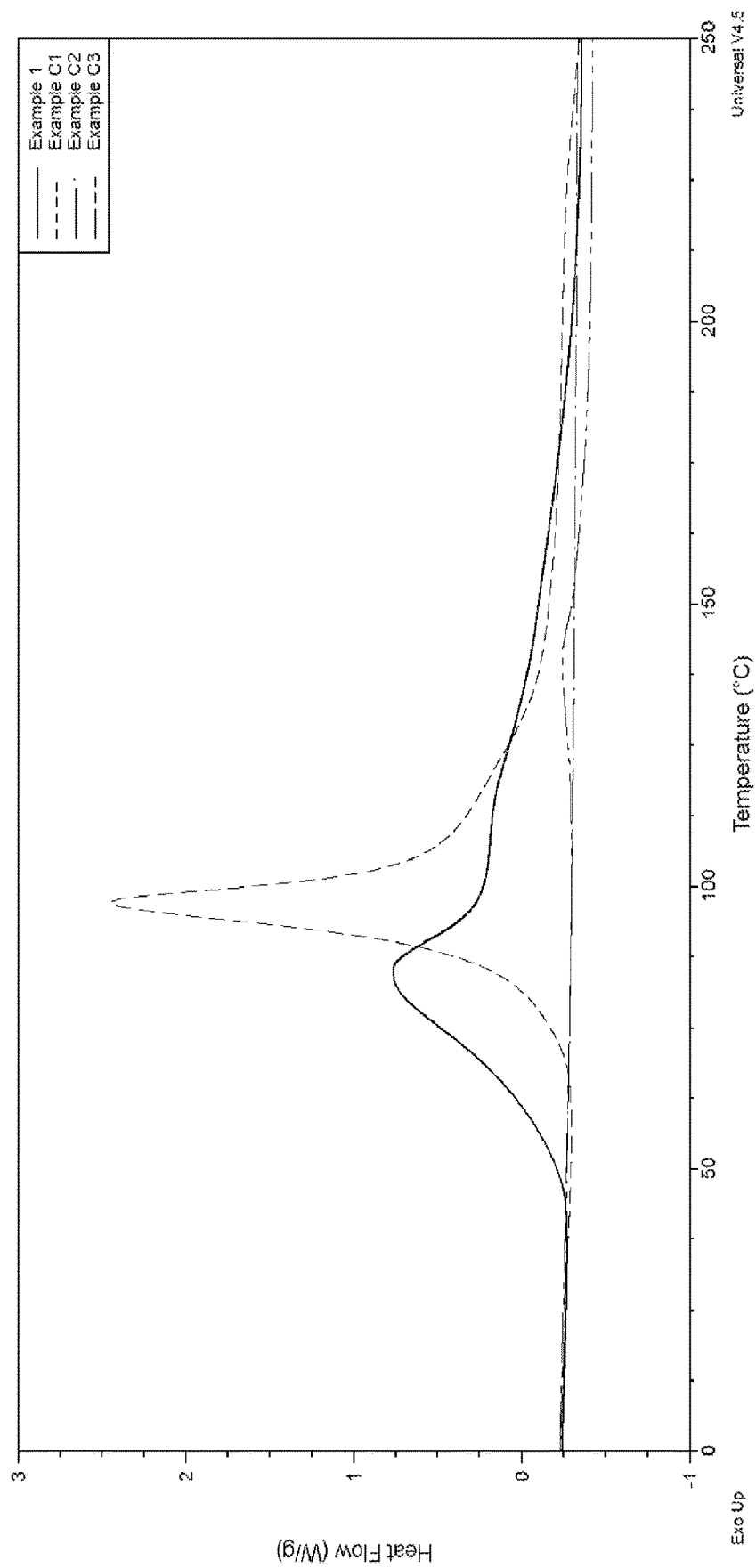
FIG. 1 shows a plot of heat flow (W/g) versus temperature, as measured by differential scanning calorimetry during curing of the resin compositions of Example 1 of the present invention and Comparative Examples C1-C3.

As used herein in reference to an organic compound, the term "aliphatic" means that the organic compound has a straight or branched chain structure and lacks any aryl or alicyclic ring moiety, wherein the chains comprise carbon atoms joined by respective single, double, or triple bonds and may optionally be interrupted by one or more heteroatoms, typically selected from oxygen, nitrogen, and sulfur heteroatoms, and the carbon atom members of the chains may each optionally be substituted with one or more organic groups that lack any aryl or alicyclic ring moiety, typically selected from alkyl, alkoxyl, hydroxyalkyl, cycloalkyl, alkoxyalkyl, haloalkyl.

As used herein, the term "acyl" means a monovalent organic radical consisting of a carbon atom bearing an organic substituent group, typically an alkyl, alkenyl or aryl group, and an oxygen atom connected to the carbon atom by a double bond.

As used herein in reference to an organic compound, the term "alicyclic" means that the compound comprises one or more non-aromatic ring moieties and lacks any aryl ring moiety, wherein the members of the one or more non-aromatic ring moieties comprise carbon atoms, each of the one or more non-aromatic ring moieties may optionally be interrupted by one or more heteroatoms, typically selected from oxygen, nitrogen, and sulfur heteroatoms, and the carbon atom members of the one or more non-aromatic ring moieties may each optionally be substituted with one or more non-aryl organic groups, typically selected from alkyl, alkoxyl, hydroxyalkyl, cycloalkyl, alkoxyalkyl, haloalkyl.

As used herein, the term "alkenyl" means an unsaturated straight, branched, or cyclic hydrocarbon radical, more typically an unsaturated straight, branched, or cyclic ($C_2$-$C_{22}$) hydrocarbon radical, that contains one or more carbon-carbon double bonds, such as, for example, ethenyl, n-propenyl, iso-propenyl, and cyclopentenyl.

As used herein, the term "alkoxy" means a saturated straight or branched alkyl ether radical, more typically a ($C_1$-$C_{22}$) alkyl ether radical, such as, for example, methoxy, ethoxy, n-propoxy, isopropoxy, n-butoxy, tert-butoxy, sec-butoxy, n-pentoxy, and nonoxy.

As used herein, the term "alkoxyalkyl" means an alkyl radical that is substituted with one or more alkoxy substituents, more typically a ($C_1$-$C_{22}$) alkyloxy ($C_1$-$C_6$) alkyl radical, such as methoxymethyl, and ethoxybutyl.

As used herein, the term "alkyl" means a monovalent straight or branched saturated hydrocarbon radical, more typically, a monovalent straight or branched saturated ($C_1$-$C_{22}$) hydrocarbon radical, such as, for example, methyl, ethyl, n-propyl, isopropyl, n-butyl, isobutyl, tert-butyl, n-hexyl, n-octyl, and n-hexadecyl.

As used herein, the term "alkylene" means a bivalent acyclic saturated hydrocarbon radical, including methylene, polymethylene, and alkyl substituted polymethylene radicals, such as, for example, dimethylene, tetramethylene, and 2-methyltrimethylene.

As used herein, the term "alkynyl" refers to an unsaturated straight or branched hydrocarbon radical, more typically an unsaturated straight or branched ($C_2$-$C_{22}$) hydrocarbon radical that has one or more carbon-carbon triple bonds per radical such as, for example, ethynyl, and propargyl.

As used herein in reference to an organic compound or radical, the term "anhydride" is a compound or radical that has two acyl groups bonded to the same oxygen atom wherein the respective carbon atoms of the two acyl groups may be linked to form a cyclic structure, such as, for example, maleic anhydride, succinic anhydride, phthalic anhydride.

As used herein, the term "aralkyl" means an alkyl group substituted with one or more aryl groups, more typically a ($C_1$-$C_{18}$) alkyl substituted with one or more ($C_6$-$C_{14}$) aryl substituents, such as, for example, phenylmethyl, phenylethyl, and triphenylmethyl.

As used herein in reference to an organic compound, the term "aromatic" means that the organic compound that comprises one or more one aryl moieties, which may each optionally be interrupted by one or more heteroatoms, typically selected from oxygen, nitrogen, and sulfur heteroatoms, and one or more of the carbon atoms of one or more one aryl moieties may optionally be substituted with one or more organic groups, typically selected from alkyl, alkoxyl, hydroxyalkyl, cycloalkyl, alkoxyalkyl, haloalkyl, aryl, alkaryl, aralkyl.

As used herein, the term "aryl" means cyclic, coplanar 5- or 6-membered organic group having a delocalized, conjugated π system, with a number of π electrons that is equal to 4n+2, where n is 0 or a positive integer, including compounds where each of the ring members is a carbon atom, such as benzene, compounds where one or more of the ring members is a heteroatom, typically selected from oxygen, nitrogen and sulfur atoms, such as furan, pyridine, imidazole, and thiophene, and fused ring systems, such as naphthalene, anthracene, and fluorene, wherein one or more of the ring carbons may be substituted with one or more organic groups, typically selected from alkyl, alkoxyl, hydroxyalkyl, cycloalkyl, alkoxyalkyl, haloalkyl, aryl, alkaryl, halo groups, such as, for example, phenyl, methylphenyl, trimethylphenyl, nonylphenyl, chlorophenyl, or trichloromethylphenyl.

As used herein, the terminology "($C_n$-$C_m$)" in reference to an organic group, wherein n and m are each integers, indicates that the group may contain from n carbon atoms to m carbon atoms per group.

The terms "cure" and "curing" as used herein may include polymerizing and/or cross-linking of the curable resin composition.

As used herein, the term "curing agent" means a compound or complex that is capable of dissociating to provide one or more species capable of initiating polymerization of the curable resin component of the curable resin composition of the present invention.

As used herein, the term "cycloalkenyl" refers to cyclic ($C_5$-$C_{22}$) alkenyl radical having a single cyclic ring and at least carbon-carbon double bond between ring carbons, which can be optionally substituted with from 1 to 3 alkyl groups, such as, for example, cyclopent-3-enyl, cyclohex-2-enyl, and cyclooct-3-enyl.

As used herein, the term "cycloalkyl" means a saturated ($C_5$-$C_{22}$) hydrocarbon radical that includes one or more cyclic alkyl rings, such as, for example, cyclopentyl, cyclooctyl, and adamantanyl.

As used herein, "epoxide group" means a vicinal epoxy group, i.e., a 1,2-epoxy group.

As used herein, the term "fiber" has its ordinary meaning as known to those skilled in the art and may include one or more fibrous materials adapted for the reinforcement of composites, which may take the form of any of particles, flakes, whiskers, short fibers, continuous fibers, sheets, plies, and combinations thereof.

As used herein, the terminology "fiber pre-form" means assembly of fibers, layers of fibers, fabric or layers of fabric plies configured to receive a liquid curable resin composition in a resin infusion process.

As used herein, the term "halo" means chloro, fluoro, bromo, or iodo, more typically chloro.

As used herein, the term "haloalkyl" means an alkyl radical that is substituted with one or more halo substituents, such as chloroethyl and trichloromethyl.

As used herein, the term "hydroxyalkyl" means an alkyl radical, more typically a ($C_1$-$C_{22}$) alkyl radical, that is substituted with one or more hydroxyl groups, such as for example, hydroxymethyl, hydroxyethyl, hydroxypropyl, and hydroxydecyl.

As used herein, the term "Lewis acid:Lewis base complex" means a molecule formed by bonding of a Lewis acid, such as, $BF_3$, $ZnCl_2$, $SnCl_4$, $FeCl_3$, and $AlCl_3$, $YbCl_3$, $BCl_3$, $AlF_3$ with a Lewis base, such as an aliphatic or aromatic amine, acetonitrile, diethyletherate, tetrahydrofuran, acetone, ethyl acetate, dimethyl acetamide, tetrahydrothiophene, trimethylphosphine, triphenylphosphine without the simultaneous loss of a leaving group.

As used herein, the term "non-aromatic epoxy compound" means a non-aromatic compound that comprises at least one, more typically, at least two, epoxide group per molecule.

As used herein "non-aromatic oxetane compound" means a non-aromatic compound that comprises at least one, and in some embodiments, two, oxetano group per molecule.

As referred to herein, a "non-crimp fabric" or "NCF" means a fabric comprising of two or more plies of unidirectional fibers, the fibers of which may be stitched, knitted, braided, discontinuous fibers, or an adhesively bonded chopped fiber mat.

As used herein, "oxyalkylene" means bivalent radical comprising an alkylene radical that is substituted with an oxy group, such as, for example, oxymethylene, and oxydimethylene.

As used herein, the term "prepreg" means a fiber reinforcement that has been pre-impregnated, fully or partially, with curable resin composition or a fabric made from woven tows of fibers that have been pre-impregnated with resin curable resin composition.

The curable resin composition of the present invention comprises at least one non-aromatic epoxy compound, at least one non-aromatic oxetane compound, or a mixture thereof. In one embodiment, the resin composition comprises at least one non-aromatic epoxy compound. In one embodiment, the resin composition comprises at least one non-aromatic oxetane compound. In one embodiment, the resin composition comprises at least one non-aromatic epoxy compound and at least one non-aromatic oxetane compound.

Suitable alicyclic epoxy compounds include alicyclic compounds having two or more epoxide groups per molecule, including known compounds such as, for example, bis(2,3-epoxy-cyclopentyl)ether, copolymers of bis(2,3-epoxy-cyclopentyl)ether with ethylene glycols, dicyclopentadiene diepoxide, 4-vinyl cyclohexenedioxide, 3,4-epoxycyclohexylmethyl, 3,4-epoxycyclohexane carboxylate, 1,2,8,9-diepoxy limonene (limonene dioxide), 3,4-epoxy-6-methyl-cyclohexylmethyl, 3,4-epoxy-6-methylcyclohexane carboxylate, bis(3,4-epoxy-6-methylcyclohexylmethyl)adipate, 2-(7-oxabicyclo[4.1.0]hept-3-yl)spiro[1,3-dioxane-5,3'-[7]oxabicyclo[4.1.0]heptane], diepoxides of allylcyclopentenyl ether, 1,4-cyclohexadiene diepoxide, 1,4-cyclohexanemethanol diglydical ether, bis(3,4-epoxycyclohexylmethyl) adipate, 3,4-epoxy-6-methylcyclohexane carboxylate, diglycidal 1,2-cyclohexane carboxylate, 3,4-epoxycyclohexylmethyl methacrylate, 3-(oxiran-2-yl)-7-oxabicyclo[4.1.0]heptane, bis(2,3-epoxypropyl) cyclohex-4-ene-1,2-dicarboxylate, 4,5-epoxytetrahydrophthalic acid diglycidyl ester, poly[oxy(oxiranyl-1,2-cyclohexanediyl)] α-hydro-ω-hydroxy-ether, bi-7-oxabicyclo[4.1.0]heptane.

In one embodiment, the cycloaliphatic epoxy compound comprises one or more alicyclic epoxy compounds in which at least one of the epoxide groups of the alicyclic epoxy compounds comprises an oxygen atom bonded to each of two carbon atom members of an aliphatic ring of the cycloaliphatic epoxy compound, including known compounds such as, for example: dicyclopentadiene diepoxide, bis(2,3-epoxycylopentyl)ether, copolymers of bis(2,3-epoxy-cyclopentyl)ether with ethylene glycols, 4-epoxycyclohexylmethyl 3,4-epoxycyclohexanecarboxylate, and 3,4-epoxy-6-methylcyclohexane carboxylate.

Suitable aliphatic epoxy compounds are aliphatic compounds having two or more epoxide groups per molecule, including known compounds such as, for example: butanediol diglycidyl ether, epoxidized polybutadiene, dipentene dioxide, trimethylolpropane triglycidyl ether, bis[2-(2-butoxyethyoxy)ethyl)ethyl] adipate, hexanediol diglycidal ether, and hydrogenated bisphenol A epoxy resin.

Suitable non-aromatic oxetane compounds include known compounds such as, for example: 3-ethyl-3[[(3-ethyloxetane-3-yl)methoxy]methyl]oxetane, oxetane-3-methanol, 3,3-bis-(hydroxymethyl) oxetane, 3-butyl-3-methyl oxetane, 3-methyl-3-oxetanemethanol, 3,3-dipropyl oxetane, and 3-ethyl-3-(hydroxymethyl) oxetane.

In one embodiment, the resin composition of the present invention comprises one or more non-aromatic epoxy compounds selected from the cycloaliphatic epoxy compounds containing an aliphatic ring such as 3,4-epoxycyclohexyl-methyl, 3,4-epoxycyclohexane carboxylate.

Suitable non-aromatic epoxy compounds and non-aromatic oxetane compounds include known, commercially available compounds, such as, for example: 3',4'-epoxycyclohexanemethyl-3,4-epoxycyclohexylcarboxylate (CELLOXIDE™ 2021P resin (Daicel Corporation) and ARALDITE CY 179 (Huntsman Advanced Materials)), bi-7-oxabicyclo[4.1.0]heptane (CELLOXIDE™ 8010 (Daicel Corporation)) 3:1 mixture of poly[oxy(oxiranyl-1,2-cyclohexanediyl)], α-hydro-ω-hydroxy-ether with 2-ethyl-2-(hydroxymethyl)-1,3-propanediol (EHPE 3150 (Daicel)).

In one embodiment, the curable resin composition of the present invention comprises, based on 100 parts by weight ("pbw") of the resin composition, from 20 to 95 pbw, more typically from 30 to 80 pbw, and even more typically from 50 to 80 pbw, of one or more non-aromatic epoxy compounds.

The curable resin composition of the present invention may further comprise, based on 100 pbw of the resin composition, an aggregate amount, of up to 50 pbw, more typically up to 30 pbw, and even more typically from 1 to 20 pbw, of one or more aromatic epoxy compounds and/or monoepoxide compounds, in addition to the non-aromatic resin component.

Suitable aromatic epoxy compounds include aromatic compounds having two or more epoxide groups per molecule, including known compounds such as, for example: polyglycidal ethers of phenols and of polyphenols, such as diglycidyl resorcinol, 1,2,2-tetrakis(glycidyloxyphenyl) ethane, or 1,1,1-tris(glycidyloxyphenyl)methane, the diglycidal ethers of bisphenol A (bis(4-hydroxyphenyl)-2,2-propane), bisphenol F (bis(4-hydroxyphenyl)methane), bisphenol C (bis(4-hydroxyphenyl)-2,2-dichloroethylene), and bisphenol S (4,4'-sulfonyldiphenol), including oligomers thereof, fluorene ring-bearing epoxy compounds, naphthalene ring-bearing epoxy compounds, dicyclopentadiene-modified phenolic epoxy compounds, epoxidized novolac compounds, and epoxidized cresol novolac compounds, polyglycidal adducts of amines, such as N, N-diglycidal aniline, N, N, N',N'-tetraglycidyl diaminodiphenylmethane (TGDDM), triglycidyl am inophenols (TGAP), triglycidyl aminocresol, or tetraglycidyl xylenediamine, or amino alcohols, such as triglycidyl aminophenol, polyglycidal adducts of polycarboxylic acids, such as diglycidal phthalate, polyglycidal cyanurates, such as triglycidal cyanurate, copolymers of glycidal(meth)acrylates with copolymerizable vinyl compounds, such as styrene glycidal methacrylate.

Suitable monoepoxide compounds include aromatic, aliphatic, and alicyclic compounds having one epoxide group per molecule, including known compounds such as, for example: saturated alicyclic monoepoxides, such as 3,3'-bis (chloromethyl)oxacyclobutane, isobutylene oxide, styrene oxide, olefinic monoepoxides, such as cyclododecadiene monoepoxide, 3,4-epoxy-1-butene.

In one embodiment, the epoxy resin composition of the present invention comprises one or more aromatic epoxy compounds selected from the diglycidal ether of bisphenol A and oligomers thereof, bisphenol F and oligomers thereof, tetraglycidyl diamino diphenyl methane, tri-glycidyl aminophenols, cresol novolac epoxy resins, and phenol novolac epoxy resins.

Suitable aromatic epoxy compounds include known, commercially available compounds such as diglycidal ether of bisphenol A (EPON™ 828, (Hexion), and ALRALDITE™ LY 1556 (Huntsman Advanced Materials)), and epoxy novolac resins (ARALDITE™ ECN 1138 epoxy novolac resins (Huntsman Advanced Materials)).

The curable resin composition of the present invention comprises one or more Lewis acid:Lewis base complexes as curing agent. Suitable Lewis acid:Lewis base complexes include, for example, complexes of: $BCl_3$:amine complexes, $BF_3$:amine complexes, such as $BF_3$:monoethylamine, BF3:propylamine, BF3:isopropyl amine, BF3:benzyl amine, BF3:chlorobenzyl amine, $BF_3$:trimethylamine, $BF_3$:pyridine, $BF_3$:THF, $AlCl_3$:THF, $AlCl_3$:acetonitrile, and $ZnCl_2$:THF.

In one embodiment, the curing agent comprises one or more one or more Lewis acid:Lewis base complexes selected from $BF_3$:monoethylamine, $BF_3$:benzyl amine, $BF_3$:isopropyl amine.

Suitable Lewis acid:Lewis base complexes are known compounds and are commercially available, such as $BCl_3$:amine complex (DY9577 complex (Huntsman)), $BF_3$:MEA complex (Ato-Tech), $BF_3$ complexed with benzyl amine and isopropyl amine, (ANCHOR™ 1040 complex (Evonik Industries)), $BF_3$ complexed with isopropyl amine adduct (ANCHOR™ 1115 complex (Evonik Industries)), $BF_3$ complexed with chlorobenzyl amine (ANCHOR™ 1170 complex (Evonik Industries)), and $BF_3$:$Cl_3$ complex (OMNICURE™ BC-120 complex (CVC Thermoset Specialties)).

The curable resin composition of the present invention comprises the one or more Lewis acid:Lewis base complexes in an amount that is effective, when the curable resin composition is exposed to intended cure conditions, to initiate curing of the curable epoxy resin composition.

In one embodiment, the curable resin composition comprises, based on 100 pbw of the resin composition, from 1 to 20 pbw, more typically from 1 to 16 pbw, and even more typically from 2 to 12 pbw, of the one or more Lewis acid:Lewis base complexes.

The curable resin composition of the present invention comprises one or more anhydride compounds as a cure accelerator.

Anhydride compounds suitable as the cure accelerator include, for example: aliphatic anhydrides, such as: dodecenyl succinic anhydride, succinic anhydride, maleic anhydride, alicyclic anhydrides, such as: methyl tetrahydrophthalic anhydride, tetrahydrophthalic anhydride, methylbicyclo[2.2.1]hept-5-ene-2,3-dicarboxylic anhydride, cis-1,2-cyclohexanedicarboxylic anhydride, hexahydrophthalic anhydride, methyl hexahydrophthalic anhydride, chlorendic anhydride, aromatic anhydrides, such as: phthalic anhydride, pyromellitic dianhydride, benzophenone-3,3',4,4'-tetracarboxylic dianhydride, 4,4'-oxydiphthalic anhydride, and polymeric anhydrides.

In one embodiment, the anhydride is an anhydride polymer or oligomer having a molecular weight of greater than or equal to about 500 g/mole and having one or more anhydride functional group per molecule.

The anhydride polymer typically has a weight average molecular weight of greater than 1,000 grams per mole, more typically from 2,000 to 20,000 g/mole, even more typically from 3,000 to 10,000 g/mole, as measured by gel permeation chromatography.

In one embodiment, the anhydride polymer has a melting point that is less than or equal to 50° C., more typically less than or equal to 40° C. In one embodiment, the anhydride polymer is soluble in or miscible with the resin compound component of the curable resin composition.

The anhydride polymer typically comprises, based on 100 mole percent of the polymer, from 1 to 50, more typically from 5 to 30, and even more typically from 5 to 15, mole percent anhydride functional groups. The anhydride polymer typically comprises, based on 1000 grams of the polymer, from 0.01 to 20, more typically from 0.1 to 10, and even more typically from 0.5 to 5 molar equivalents of anhydride.

In one embodiment, the polymeric anhydride is an anhydride graft copolymer, in which one or more pendant cyclic anhydride groups are grafted onto a substrate polymer chain (the polymer "backbone"), wherein the polymer backbone may be a synthetic polymer, such as a synthetic homopolymer, or copolymer, such as a random, alternating, or block copolymer or a naturally occurring polymer, such as a natural oil.

Suitable anhydride graft copolymers include those in which one or more anhydrides of an unsaturated dicarboxylic acid, such as, for example, maleic anhydride, succinic anhydride, citraconic anhydride, or itaconic anhydride, are grafted onto a polymer backbone to form the pendant cyclic anhydride groups of the anhydride graft copolymer.

Suitable polymer backbones may be polydiene homopolymers and copolymers, such as a polybutadiene, poly (isoprene), poly (chloroprene), poly(styrene-butadiene), poly(butadiene-acrylonitrile-styrene) copolymers, poly(styrene-butadiene-styrene) tri-block polymers, and a (styrene-ethylene-butylene-styrene) block copolymers, and polyalkylene homopolymers and copolymers, such as polyethylene, polypropylene, poly(propylene-acrylic acid) copolymer, poly(propylene-styrene) copolymers.

Natural oils can also be grafted with anhydride groups, include, for example, coconut oil, palm oil, castor oil, olive oil, peanut oil, rapeseed oil, soya oil, sunflower oil, linseed oil.

In one embodiment, the anhydride polymer is a random, alternating, or block copolymer that comprises:
(a) one or more cyclic anhydride-functional monomeric units, and
(b) one or more second monomeric units, each of which is absent any cyclic anhydride-functional group.

Suitable unsaturated dicarboxylic anhydrides from which to derive the cyclic anhydride-functional monomeric units of the anhydride polymer include unsaturated, more typically mono-unsaturated, dicarboxylic anhydrides such as maleic anhydride, succinic anhydride, citraconic anhydride, itaconic anhydride, ethyl maleic anhydride, phenyl maleic anhydride, benzyl maleic anhydride, dimethyl maleic anhydride, dibenzyl maleic anhydride, chloromaleic anhydride, and mixtures thereof, more typically, maleic anhydride or succinic anhydride.

Suitable unsaturated monomers from which to derive the second monomeric units include organic compounds having one or more unsaturated site per molecule that are copolymerizable with the unsaturated dicarboxylic anhydride(s) from which the cyclic anhydride monomeric units of the anhydride polymer are derived, including for example, olefinic co-monomers, such as ethylene, propylene, butene, pentene, butadiene, isoprene, and chloroprene, vinyl-functional co-monomers, such as styrene, chlorostyrene, and unsaturated carboxylic acids and their esters, such as acrylic acid, methacrylic acid, ethyl acrylate, butyl acrylate, methyl methacrylate, and butyl methacrylate.

Suitable anhydride polymers can be synthesized by known methods and include, for example, polypropylene-graft-maleic anhydride copolymers, polybutadiene-graft-maleic anhydride copolymers, poly(styrene-co-butadiene)-graft-maleic anhydride copolymers, poly(acrylonitrile-co-butadiene-co-styrene)-graft-maleic anhydride copolymers, poly(propylene-co-acrylic acid)-graft-maleic anhydride copolymers, poly(propylene-styrene)-graft-maleic anhydride copolymers, poly(styrene-co-maleic anhydride) copolymers, poly(styrene-co-butadiene-co-maleic anhydride) copolymers, poly(styrene-co-itaconic anhydride) polymers, and poly(styrene-co-citraconic anhydride).

Suitable anhydride polymers include known, commercially available compounds, such as, maleic anhydride functionalized 1,4-cis polybutadiene (POLYVEST™ MA 75 polymeric anhydride (Evonik Industries), RICON™ 184 MA6 maleinized butadiene styrene copolymer (Cray Valley USA, LLC)).

The curable resin composition of the present invention comprises an amount of the one or more anhydride compounds that is effective to, when the curable resin composition is exposed to intended cure conditions, accelerate the cure of the curable resin composition compared to an otherwise analogous curable resin composition that lacks the one or more anhydride compounds.

In one embodiment, the curable resin composition comprises, based on 100 pbw of the resin composition, from 1 to 50 pbw, more typically from 5 to 45 pbw, even more typically from 10 to 40 pbw, of the one or more anhydride compounds.

In one embodiment, the curable resin composition comprises from greater than 0, or from 0.005, or from 0.01, or from 0.015, or from 0.02 molar equivalent of anhydride groups per molar equivalent epoxide groups and/or oxetane groups to less than 0.5, or to 0.4, or to 0.3, or to 0.25, or to 0.2 molar equivalent of anhydride groups per molar equivalent epoxide groups and/or oxetane groups.

In one embodiment, the curable resin composition comprises from greater than 0 to less than 0.5, or from 0.005 to 0.4, or from 0.01 to 0.3, or from 0.015 to 0.3, or from 0.02 to 0.25, or from 0.02 to 0.2 molar equivalent of anhydride groups per molar equivalent epoxide groups and/or oxetane groups.

In one embodiment, curable resin composition of the present invention comprises from 20 to 50 pbw, more typically from 20 to 40 pbw, and even more typically 25 to 35 pbw, of the one or more anhydride compounds per 100 pbw of the Lewis acid:Lewis base complex component of the resin composition.

In one embodiment, the curable resin composition comprises an amount of the Lewis acid:Lewis base complex in a ratio of up to about 1:2, typically from 1:25 to 1:2, more typically from 1:20 to 1:5, and even more typically from 1:15 to 1:5, of molar equivalents of Lewis acid:Lewis base complex to molar equivalents of epoxide and/or oxetano groups of the resin component of the of the resin composition.

In one embodiment, the curable resin composition comprises an amount of the polymeric anhydride in a ratio of up to about 1:1, typically from 1:20 to 1:1, more typically from 1:15 to 1:3, and even more typically from 1:5 to 1:10, of molar equivalents of anhydride groups to molar equivalents of the Lewis acid:Lewis base complex component of the resin composition.

In one embodiment, curable resin composition of the present invention comprises:
from 20 to 95 pbw of one or more non-aromatic epoxy compounds per 100 pbw of the resin composition,
optionally, an aggregate amount of up to 50 pbw of one or more aromatic epoxy compounds and/or monoepoxide compounds per 100 pbw of the resin composition,
an amount of the Lewis:acid Lewis base complex in a ratio of 1:25 to 1:2, more typically from 1:20 to 1:5, and even more typically from 1:15 to 1:5, of molar equivalents of Lewis acid:Lewis base complex to molar equivalents of epoxide and/or oxetano groups of the resin component of the of the resin composition, and an amount of the polymeric anhydride in a ratio of up to about 1:1, typically from 1:20 to 1:1, more typically from 1:15 to 1:3, even more typically from 1:5 to 1:10 of molar equivalents of anhydride groups to molar equivalents of the Lewis acid:Lewis base complex component of the resin composition.

In one embodiment, the amount of the Lewis:acid Lewis base complex is in a ratio of 1:20 to 1:5 of molar equivalents of Lewis acid:Lewis base complex to molar equivalents of epoxide and/or oxetano groups of the resin component of the of the resin composition, and the amount of the polymeric anhydride in a ratio of up to about 1:1, typically from 1:20 to 1:1, of molar equivalents of anhydride groups to molar equivalents of the Lewis acid:Lewis base complex component of the resin composition, thereby providing an amount of up to 0.2, more typically from 0.0025 to 0.2, molar equivalent of anhydride groups per molar equivalent epoxide groups.

In one embodiment, the amount of the Lewis:acid Lewis base complex is in a ratio of 1:15 to 1:3 of molar equivalents of Lewis acid:Lewis base complex to molar equivalents of epoxide and/or oxetano groups of the resin component of the of the resin composition, and the amount of the polymeric anhydride in a ratio of up to about 1:3, typically from 1:15 to 1:3, of molar equivalents of anhydride groups to molar equivalents of the Lewis acid:Lewis base complex component of the resin composition, thereby providing an amount of up to 0.167, more typically from 0.0027 to 0.167, molar equivalent of anhydride groups per molar equivalent epoxide groups.

In one embodiment, the resin composition of the present invention further comprises an amount of nitrogen base compound effective to slow the initial cure rate of the resin composition, preferably without significantly prolonging the cure time or altering the properties of the cured resin composition. The addition of the nitrogen base compound permits fine tuning of the cure rate of the resin composition of the present invention.

Suitable nitrogen base compounds include imidazole compounds include 1-cyanoethyl-2-ethyl-4-methylimidazole, 2-ethyl-4-methylimidazole, 1-cyanoethyl-2-methylimidazole, 1-methyl imidazole, 4-methyl imidazole, 1-benzyl-2-phenylimidazole, 1-benzyl-2-methylimidazole, 1-(3-aminopropyl)imidazole, 1,2-dimethylimidazole, 1-cyanoethyl-2-undecylimidazole, and 4,5-bis[(2-cyanoethoxy)methyl]-2-phenyl-1H-imidazole-1-propiononitrile, and mixtures thereof, and non-imidazole nitrogen bases include aliphatic, aromatic and alkyl-aryl amines, especially tertiary aliphatic amines including dimethylbenzylamine, trimethylamine, tributylamine, triphenylamine methyldiphenylamine, diethylphenylamine, and mixtures thereof.

The amount of an imidazole compound effective to slow the initial cure rate of the resin composition, without significantly prolonging the cure time or altering the properties of the cured resin composition is typically an amount of up to 6 pbw, more typically from greater than 0.1 to 5 pbw, more typically from 0.1 to 4 pbw per 100 pbw of the combined amount of nitrogen base compound and Lewis acid:Lewis base complex.

One or more additives may be added to the curable resin composition in order to impart certain properties to the uncured composition or to the cured composite structure. The additives may be added to influence one or more of mechanical, rheological, electrical, optical, chemical, flame resistance and/or thermal properties of the cured or curable resin composition. Examples of such additives may include, but are not limited to, flame retardants, ultraviolet (UV) stabilizers, inorganic fillers, conductive particles or flakes, flow modifiers, thermal enhancers, density modifiers, toughening additives (such as core-shell particles, thermoplastic polymers), and short fibers (inorganic or organic).

In one embodiment, wherein the anhydride component of the composition comprises a polymeric anhydride, the curable resin composition of the present invention, when cured as neat resin, i.e., in the absence of reinforcing fibers, exhibits improved toughness, compared to an analogous composition that lacks the polymeric anhydride component, as indicated by improved fracture energy (as measured by notched impact testing according to ASTM D-5045-99) in the substantial absence of any other toughening additives. For example, an embodiment of the curable resin composition of the present invention typically exhibits, after curing at a temperature of from 100° C. to 180° C. for a time period of less than or equal to 20 minutes, a fracture toughness ($K_{IC}$) of greater than or equal to 0.3, more typically greater than or equal 0.5, MegaPascals·meter$^{1/2}$ (MPa·m$^{1/2}$), as measured by notched impact testing according to ASTM D-5045-99.

In one embodiment, when the resin, curing agent, and cure accelerator of the curable resin composition of the present invention are initially combined, the composition exhibits a viscosity of less than or equal to 50 Poise, and, after reacting the composition at a temperature of from about 20° C. to 30° C., more typically at room temperature, for from 4 to 7 hours, the composition exhibits a viscosity of from 50,000 to 300,000 Poise.

The curable resin composition is useful as the matrix for a curable fiber reinforced resin matrix composite material, that is, a material, comprising fibers impregnated with the curable resin composition according to claim 1.

Suitable fibers for use as the fiber component of the curable fiber reinforced resin matrix composite material include, for example, carbon fibers, graphite fibers, glass fibers, such as E glass fibers, ceramic fibers, such as silicon carbide fibers, synthetic polymer fibers, such as aromatic polyamide fibers, polyimide fibers and polybenzoxazole fibers. The areal weight of a single layer or cross section of such fibers can vary from 50 to 600 g/m$^2$. In one embodiment, the fibers comprise carbon fibers, glass fibers, or both carbon fibers and glass fibers. In one embodiment, the fibers comprise carbon fibers, including, for example, carbon fibers that exhibit a tensile strength of greater than or equal to 3.5 GigaPascals ("GPa") and a tensile modulus of greater than or equal to 200 GPa. Suitable carbon fibers are known materials that are commercially available, such as for, example, Tenax E STS40 F13 24 k fibers (Toho Tenax Co., Ltd.), and Torayca T800S fibers (Toray).

The curable fiber reinforced resin matrix composite material of the present invention typically comprises, based on 100 pbw of the curable fiber reinforced resin matrix composite material, from 50 to 80 pbw, and more typically, from 60 to 70 pbw, of fibers.

The curable fiber reinforced resin matrix composite material is made by combining fibers with curable resin composition of the present invention. In one embodiment, the fibers are pre-impregnated with the curable resin composition of the present invention to form a prepreg. In another embodiment, the fibers are pre-impregnated with the curable resin composition of the present invention by a filament winding process. In another embodiment, a fiber preform is impregnated with curable resin composition using a resin infusion process. In each case, the curable resin composition is formulated and/or partially cured in order to adjust the properties of the curable fiber reinforced resin matrix composite material to fit the selected approach, for example, to minimize flow of the resin composition from the material, and/or to provide a material having a selected tack or stiffness.

In the present invention, the resin, Lewis acid:Lewis base complex, and anhydride accelerator are mixed together before associating the curable resin composition with the fibers. The resin may be preheated to adjust the unmixed and mixed viscosities as appropriate. The mixed resin composition can then be dispensed through either a static or dynamic mix nozzle, applying the mixed curable resin composition directly onto the fiber tows.

The mix ratio of resin, Lewis acid:Lewis base complex, anhydride accelerator, and, optionally, nitrogen base compound, can be adjusted to within wide ranges, which allows adjustment of the properties of the mixed resin. The amount of tack and flexibility of the B-staged material before final curing can also be controlled by adjusting relative amounts of the epoxide- or oxetane-functional resin component of the resin composition, the Lewis acid:Lewis base complex, and the anhydride accelerator.

An embodiment of the curable resin composition suitable for use in a prepreg typically further comprises a thermoplastic polymer that is soluble in the resin composition in an amount effective to increase the viscosity of the curable resin composition, typically to about 5,000 to 30,000 Pas. In one embodiment, a prepreg is made by hot melt blending, at a temperature of from 30° C. to 150° C., more typically 50° C. to 100° C., of the components of the composition other than the Lewis acid:Lewis base and anhydride components with the thermoplastic polymer and subsequently adding the Lewis acid:Lewis base and anhydride components to the blended resin and polymer when, after cooling of the blended resin and polymer if needed, the blended resin and polymer are at a temperature of from about 40° C. to 70° C., and then extruding the resin composition as a film that can be consolidated onto unidirectional fibers or fabric, either immediately or at a later stage. In an alternative embodiment, a prepreg is made by dissolving the components of the curable resin composition in a solvent, applying the solution to the fibers or fabric, and subsequently removing the solvent by evaporation. The heat or solvent is used to lower the viscosity of the curable resin composition to enable impregnation of the fibers. When the curable resin composition impregnated prepreg is cooled or, in the alternative embodiment, when the solvent is removed, the viscosity of the curable resin composition increases, such that any flow of the resin composition from the prepreg is minimized and the resulting prepreg can be more easily handled.

In one embodiment of the curable resin composition of the present invention suitable for use in prepreg applications, the curable resin composition comprises an aggregate amount of from 5 to 50 pbw, more typically from 10 to 40 pbw, of one or more thermoplastic polymers that are soluble in the resin composition per 100 pbw of the curable resin composition. Suitable soluble thermoplastic polymers include thermoplastic polymers that are soluble in the curable resin composition and that remain stable at elevated, e.g., up to 150° C., temperatures, including, for example, polysulfone polymers, polyethersulfone polymers, polyetherethersulfone polymers, polyetherimide polymers, polyphenylene oxide polymers, copolymers of acrylonitrile and butadiene, adducts of acrylonitrile/butadiene copolymers with other compounds and mixtures thereof.

Typically, layers of prepreg are placed adjacent one another in a stacking arrangement. In certain embodiments, the prepregs within the stack, or "layup", may be positioned in a selected orientation with respect to one another. The prepregs may optionally be stitched together with a threading material in order to inhibit their relative motion from a selected orientation.

A layup may comprise any combination of fully impregnated prepregs, and partially impregnated prepregs. Prepreg layups are typically manufactured by hand layup, automated tape layup (ATL), and/or automated fiber placement (AFP).

In an alternative to the prepreg approach, the fibers of the composite material are impregnated with curable resin composition of the present invention in a filament winding, in which tows of fibers are impregnated using an in-line process and are subsequently wound around a rotating mandrel via a winding head that is moved back and forth along the mandrel. This technique allows a variety of fiber orientations, and consequently, a wide variety of interlocking angles of fibers, to be constructed.

In the filament winding application, a low viscosity resin composition is required, so that the thermoplastic polymer component used to adapt the resin composition for use in a prepreg is omitted. A filament wound fiber reinforced resin matrix composite material according to the present invention can be "B-staged" by allowing the resin composition to react at ambient temperature for 4 to 8 hours, during which time the resin composition will reach a viscosity, typically about 50,000 to 300,000 Poise, to minimize flow of the resin composition from the material and allow the filament wound material to be more easily handled. Removal of the filament wound material from the mandrel creates a "blank" that can be used as a substrate in a way similar to the above described use of prepreg materials.

Typically, a layup is consolidated under the action of one or more of heating, vacuuming, and applied pressure, whereby the curable resin composition flows so as to displace gases from the layup void spaces and occupy, ideally, completely fill, the void spaces between fibers in the prepreg and the void spaces between prepreg layers.

In one embodiment, the prepreg layup is consolidated in vacuum bag. In this approach, the curable prepreg layup is placed in contact with a tool and then enclosed with an impervious membrane. The tool may have a relatively planar surface, curved surface, or other three-dimensional configuration. In one embodiment, a breather layer, such as a non-impregnated fiberglass sheet, is positioned adjacent at least one of the horizontal surfaces of the layup for surface breathing. Sealant tapes are typically used, as necessary, to create an approximately vacuum tight seal between the tool and the membrane. One or more dams may be placed adjacent the edges of the layup to inhibit flow of the curable resin composition outside of the layup, or to improve gas flow. A perforated release film, for example, a perforated polyester film, may be inserted between the breather layer and the prepreg layup and a solid release film, for example, a (non-perforated) polyester film, may also be inserted between the pre-preg layup and the tool in order to facilitate the removal of the consolidated composite from the setup.

The enclosed volume is evacuated and the layup is then heated to cause consolidation. Heating may be applied by placing the vacuum bag setup in an oven or under pressure, typically about 90 pounds per square inch gage pressure, in an autoclave. The heating may be carried out with pressure, for example in an autoclave, or without pressure, for example, in an oven, in order to lower the viscosity of the matrix and induce pressure differentials that allow the matrix resin composition to flow. The consolidated layup is subsequently cured at a more highly elevated temperature within the same autoclave or oven to produce a final composite part.

In an alternative embodiment, the curable composite material may be press cured, for example, under the above described temperature conditions and a pressure of about 90 pounds per square inch, immediately after layup or removal from the mandrel, without requiring a consolidation step. For example, a curable composite material made by filament winding according to the present invention may be used in rapid press moulding processes to make cured composite parts. This is generally done in two stages. After the resin is applied to the fiber tows, the tows are wound around a mandrel in a filament winding process as described above. Once the appropriate winding pattern, multilayer thickness has been achieved, the impregnated woven construction is removed from the mandrel and laid flat. The first part of the cure is the B-staging of the resin to increase the viscosity of the resin such that a prepreg-like blank is obtained, that is, a curable composite material that exhibits low resin flow, low resin transfer to protective films, and retention of an amount of flexibility and tack similar to that of a curable prepreg composite material.

In one embodiment, the prepreg and filament wound blank materials have a shelf life of from 1 to 30 days, more typically from 1 to 10 days, when stored at a temperature of less than −18° C., more typically from −25 to −15° C.

The filament wound material can be cured to a final part either before B-staging or, more typically, in order to avoid handling difficulties and distortion of the fiber placement and orientation, after B-staging. B-staging comprises allowing the curable filament wound composite material to react for a length of time and at a temperature, dependent on the curable resin composition, to allow the viscosity of the curable resin composition to increase to the point that a blank having the desired prepreg-like properties is obtained. For example, the composition of Example 1 of the present application can be B-staged to an appropriate prepreg-like state after 5-8 hours at ambient temperature.

The prepreg or filament wound blank can be cured to a high cure conversion to thereby form a cured fiber reinforced resin matrix composite article in a press (compression molding), autoclave or by vacuum bag-oven method. The cure cycle is dependent on the composition as well as the temperature of the press or other equipment. For instance, the composition of Example 1 of the present application may be press cured using a cure cycle of 5 minutes at 145° C.

In one embodiment, a fiber preform is impregnated with curable resin composition using a resin infusion process.

A fiber pre-form may comprise, for example, continuous fibers: plies of a unidirectional continuous fiber tape, a 3-dimensional woven fabric, a non-woven discontinuous fiber mat, or a non-crimp fabric.

In one embodiment, a fiber pre-forms is infused with the curable resin composition of the present invention, using conventional resin infusion techniques to form a fiber reinforced resin matrix composite material and subsequently cured a temperature of from 100° C. to 180° C. for a time period of less than or equal to 20 minutes to form a cured fiber reinforced resin matrix composite article.

In one embodiment the resin infusion process is a 2-part resin transfer molding (RTM) process, or high pressure resin transfer molding (HP-RTM) process. The RTM (and HP-RTM) process is a process by which a resin composition is introduced into a closed mold which contains a dry fiber pre-form. The fiber preform is composed of reinforcement fibers, which may take the form of layers of continuous fibers or woven fabric. The fiber preform may be shaped into a desired three-dimensional configuration suitable for fabrication of a composite part. The curable resin composition is injected into the mold which is maintained under low pressure or under vacuum. It is desirable to use a resin composition that exhibits a relatively low viscosity at the injection temperature, such as, for example, in the case of RTM, a viscosity of less than or equal to 1 Poise at the injection temperature of 50 to 100° C., in order to obtain the optimum mold filling and wetting of the fiber pre-form. Further, the resin system must maintain this low viscosity for a period of time sufficient to completely fill the mold and infuse the fiber preform. For RTM processing, such time is frequently measured in terms of the pot life of the resin, which can be defined as the time required for the resin to reach 5 Poise at a given temperature. After the mold is filled, the resin composition-infused fiber preform is heated in accordance with the appropriate cure schedule to cure the curable resin composition. The resulting molded part can then be removed from the mold and post-cured as necessary.

The fiber reinforced resin matrix composite material of the present invention is shaped and cured to form a cured fiber reinforced resin matrix article, such as, for example, parts for aerospace, automotive, oil and gas field, wind turbine blade, and sporting goods applications.

In one embodiment, prepregs and filament wound blanks of the fiber reinforced composite material of the present invention have a shelf life of from 1 to 30 days, more typically from 1 to 10 days, when stored at a temperature of less than −18° C., more typically from −25 to −15° C., and are capable of being cured at a temperature of greater than or equal to 60° C., more typically of from 100° C. to 180° C., and even more typically of from 120° C. to 160° C., for a time period of less than or equal to 20 minutes, more typically of from 1 to 15 minutes, and even more typically of from 1 minute to 10 minutes, to provide a cured fiber reinforced resin matrix composite article having a resin matrix that exhibits a high degree of cure conversion, typically of greater than or equal to 85%, more typically greater than or equal to 90%, and even more typically greater than or equal to 95%, and high glass transition temperature, typically greater than or equal to 210° C., more typically greater than or equal to 215° C., and even more typically greater than or equal to 220° C., as well as good mechanical strength and, in embodiments comprising a polymeric anhydride, good fracture toughness.

Example 1 and Comparative Examples C1, C2, and C3

The resin composition of Example 1 was made by mixing 75 pbw (0.5769 molar equivalent of epoxide groups) of a cycloaliphatic compound 34-epoxycyclohexane)methyl 3,4-epoxycyclohexylcarboxylate (CELLOXIDE™ 2021P resin (Daicel Corporation)) with 9 pbw (0.0514 molar equivalents of BF3) of a $BF_3$:amine complex (BF3:amine complex (ANCHOR™ 1040 complex (Air Products)) and 25 pbw (0.0356 molar equivalents of anhydride group) of a polymeric anhydride (maleic anhydride functionalized 1,4-cis polybutadiene (POLYVEST™ MA75 polymer (Evonik Industries)), providing a ratio of 0.0892 molar equivalents of $BF_3$ groups per molar equivalent of epoxide groups and 0.0618 molar equivalents of anhydride groups per molar equivalent of epoxide groups.

The resin composition of Comparative Example C1 was made by mixing 100 pbw (0.7692 molar equivalents of epoxide groups) of a cycloaliphatic resin 3',4'-epoxycyclohexane)methyl 3,4-epoxycyclohexylcarboxylate (CELLOXIDE™ 2021P resin (Daicel Corporation)) combined with 6 pbw (0.0343 molar equivalents $BF_3$) of a Lewis acid:Lewis base complex ($BF_3$:benzyl amine complex, ANCHOR™ 1040 complex (Evonik Industries)).

The resin composition of Comparative Example C2 was made by mixing 75 pbw (0.5769 molar equivalents of epoxide groups) of a cycloaliphatic resin 3',4'-epoxycyclohexane)methyl 3,4-epoxycyclohexylcarboxylate (CELLOXIDE™ 2021P resin (Daicel Corporation)) with 25 pbw (0.0579 molar equivalents of anhydride groups) of a polymeric anhydride (maleic anhydride functionalized 1,4-cis polybutadiene (POLYVEST™ MA75 (Evonik Industries)).

The resin composition of Comparative Example C3 was made by mixing 75 pbw (0.5769 molar equivalents of epoxide groups) of a cycloaliphatic resin (3',4'-epoxycyclohexane)methyl 3,4-epoxycyclohexylcarboxylate (CELLOXIDE™ 2021P resin (Daicel Corporation)) with 1.6 pbw (0.0098 molar equivalents of imidazole groups) of a Lewis base (1-(cyanoethyl)-2-ethyl-4-methylimidazole) and 25 pbw (0.0356 molar equivalents of anhydride groups) of a polymeric anhydride (maleic anhydride functionalized 1,4-cis polybutadiene (POLYVEST™ MA75 (Evonik Industries)).

Samples of the resin compositions of Example 1 and Comparative Examples C1, C2, and C3 were made and cured according to the cure conditions indicated in Table I below.

The exotherm during cure was measured by differential scanning calorimetry ("DSC") using a TA instruments Q2000 at a 10° C./min ramp rate and a plot of the DSC results is shown in FIG. 1 as a plot of heat flow (W/g) versus temperature, as measured during curing of the resin compositions of Example 1 of the present invention and the resin compositions of Comparative Examples C1-C3.

The degree of cure conversion was measured by the residual enthalpy method determined by DSC measurements.

The respective glass transition temperatures of the cured composition of Example 1 and Comparative Example 1 were measured by dynamic mechanical analysis using a TA Instruments Q800 Dynamic Mechanical Analysis instrument. The glass transition temperature of the composition of Comparative Example 2 was measured by the onset of storage modulus increase, during a temperature ramp of 5° C./min at a frequency of 1 Hz and an amplitude of 50 microns. The glass transition temperature of the composition of Comparative Example 3 was not measured. The value indicated in Table 1 was reported In U.S. Pat. No. 5,962,586 as 251° C. as measured by TMA, for a sample cured at least 30 min at 200° C.

The resin composition of Example 1, when cured for 5 min. at 145° C., exhibited a fracture toughness of 0.6 $MPa \cdot m^{1/2}$, as measured by notched impact testing according to ASTM D-5045-99.

The curing conditions and results are set forth in Table I below, as Onset Temperature of the DSC peak exotherm, cure conversion (%), and minimum glass transition temperature (° C.).

TABLE 1

| Ex # | DSC Exotherm Peak Onset Temperature (° C.) | Cure Cycle | Cure Conversion (%) | Minimum Glass Transition Temperature (° C.) |
|---|---|---|---|---|
| 1 | 49 | 5 min. at 145° C. | 96 | 230 |
| C1 | 80 | 10 min. at 150° C., and post-cure 30 min. at 200° C. | 98 | 250 |
| C2 | >200 | >1 hour at 200° C. | No data | 200 |
| C3 | 85 | Not Measured (reported as 15-45 min at 115° C. and post-cure at least 30 min at 200° C.*) | Not Measured (reported as 100*) | Not Measured (reported as 251, as measured by TMA*) |

*as reported in U.S. Pat. No. 5,962,586

The results set forth in Table 1 show that the resin composition of Example 1 cures more quickly than Comparative Examples C1, C2, or C3, without compromising the properties of a cured resin. The resin composition of Example 1 cured more readily, that is more quickly and at a lower temperature than Comparative Examples C1, C2, or C3 to a cure conversion that is similar to that of Comparative Examples C1, C2, and C3, to form a polymer having a glass transition temperature that is similar to that of Comparative Examples C1, C2, and C3.

Example 2

The resin composition of Example 1 was applied onto carbon fibers with a filament winding process. The prepreg was partially cured to obtain the necessary stiffness and tack level. Finally, the prepreg assembly was press cured to make reinforced carbon composite for automotive application.

Examples 3-8

The resin composition of Example 3 was made by mixing 75 pbw of a cycloaliphatic compound (3',4'-epoxycyclohexane)methyl 3,4-epoxycyclohexylcarboxylate (CELLOXIDE™ 2021P resin (Daicel Corporation)) with 9 pbw of a $BF_3$ amine complex ($BF_3$:benzyl amine complex (ANCHOR™ 1040 complex (Air Products)), and 25 pbw of a polymeric anhydride (maleic anhydride functionalized styrene-butadiene copolymer (RICON™ 184 MA6 (Cray Valley USA LLC)), which provided molar ratios for the reactive groups of 0.0892 molar equivalents of the $BF_3$ per molar equivalent of epoxide groups and 0.0263 molar equivalents of the anhydride group per molar equivalent of epoxide groups.

The resin composition of Example 4 was made by mixing 75 pbw of a cycloaliphatic compound 3',4'-epoxycyclohexane)methyl 3,4-epoxycyclohexylearboxylate (CELLOXIDE™ 2021P resin (Daicel Corporation)) with 9 pbw of a $BF_3$ amine complex ($BF_3$:benzyl amine complex (ANCHOR™ 1040 complex (Air Products)) and 25 pbw of a polymeric anhydride (maleic anhydride functionalized polybutadiene (RICON™ 131 MA20 (Cray Valley USA LLC)), which provided molar ratios for the reactive groups of 0.0892 molar equivalents of $BF_3$ per molar equivalent of epoxide groups and 0.0875 molar equivalents of anhydride group per molar equivalent of epoxide groups.

The resin composition of Example 5 was made by mixing 75 pbw of a cycloaliphatic compound 3',4'-epoxycyclohexane)methyl 3,4-epoxycyclohexylcarboxylate (CEL- LOXIDE™ 2021P resin (Daicel Corporation)) with 9 pbw of a BF$_3$ amine complex (BF3: benzylamine complex (ANCHOR™ 1040 complex (Air Products)) and 25 pbw of a polymeric anhydride (maleic anhydride functionalized 1,4-cis polybutadiene (POLYVEST™ EP MA120 (Evonik Industries)), which provided molar ratios for the reactive groups of 0.0892 molar equivalents of BF$_3$ per molar equivalent of epoxide groups and 0.1004 molar equivalents of anhydride group per molar equivalent of epoxide groups.

The resin composition of Example 6 was made by mixing 75 pbw of a cycloaliphatic compound 3',4'-epoxycyclohexane)methyl 3,4-epoxycyclohexylcarboxylate (CELLOXIDE™ 2021P resin (Daicel Corporation)) with 9 pbw of a BF$_3$ amine complex (BF3: benzylamine complex (ANCHOR™ 1040 complex (Air Products)) and 41 pbw of a polymeric anhydride (maleic anhydride functionalized 1,4-cis polybutadiene (POLYVEST™ EP MA120 (Evonik Industries)), which provided molar ratios for the reactive groups of 0.0892 molar equivalents of BF$_3$ per molar equivalent of epoxide groups and 0.1647 molar equivalents of anhydride group per molar equivalent of epoxide groups.

The resin composition of Example 7 was made by mixing 75 pbw of a cycloaliphatic compound 3',4'-epoxycyclohexane)methyl 3,4-epoxycyclohexylcarboxylate (CELLOXIDE™ 2021P resin (Daicel Corporation)) with 9 pbw of a BF$_3$ amine complex (BF3: benzylamine complex (ANCHOR™ 1040 complex (Air Products)) and 16.78 pbw of a polymeric anhydride (maleic anhydride functionalized 1,4-cis polybutadiene (POLYVEST™ EP MA120 (Evonik Industries)), which provided molar ratios for the reactive groups of 0.0892 molar equivalents of BF$_3$ per molar equivalent of epoxide groups and 0.0674 molar equivalents of anhydride group per molar equivalent of epoxide groups.

The resin composition of Example 8 was made by mixing 75 pbw of a cycloaliphatic compound 3',4'-epoxycyclohexane)methyl 3,4-epoxycyclohexylcarboxylate (CELLOXIDE™ 2021P resin (Daicel Corporation)) with 9 pbw of a BF$_3$ amine complex (BF3: isopropyl amine complex (ANCHOR™ 1115 complex (Air Products)) and 41 pbw of a polymeric anhydride (maleic anhydride functionalized 1,4-cis polybutadiene (POLYVEST™ EP MA120 (Evonik Industries)), which provided molar ratios for the reactive groups of 0.1229 molar equivalents of BF$_3$ per molar equivalent of epoxide groups and 0.1004 molar equivalents of the anhydride group per molar equivalent of epoxide groups.

Each of the compositions of Examples 3-8 was cured for 5 min. at 145° C.

Figure 2:
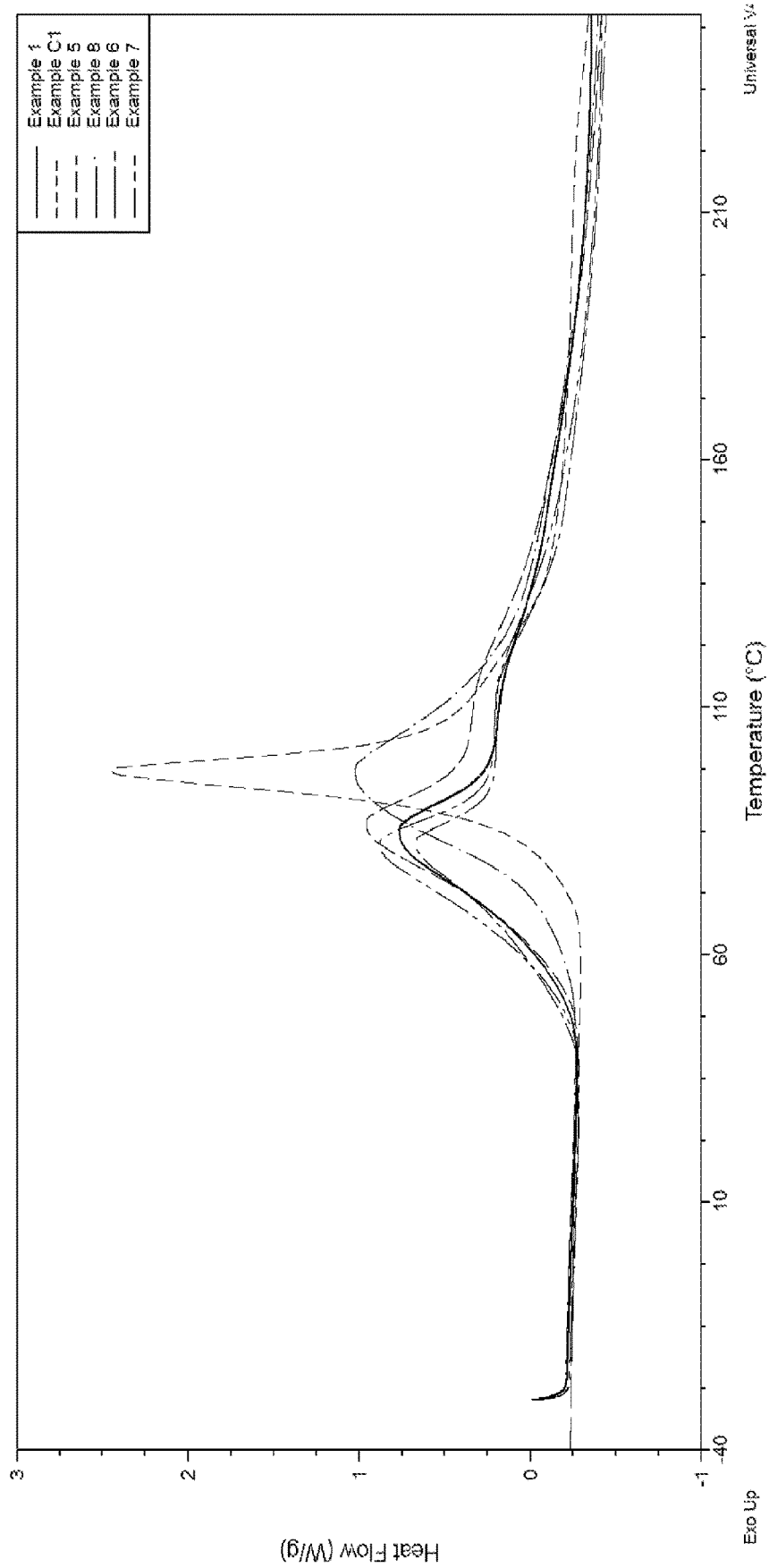
FIG. 2 shows a plot of heat flow (W/g) versus temperature, as measured by differential scanning calorimetry during curing of the resin compositions of Examples 1, 5, 6, 7, 8 of the present invention and Comparative Example C1.

The exotherm during cure was measured by DSC using a TA instruments Q2000 at a 10° C./min ramp rate and a plot of the DSC results is shown in FIG. 2 as a plot of heat flow (W/g) versus temperature, as measured during curing of the resin compositions of Examples 1, 5, 6, 7, and 8 and Comparative Example C1.

The respective glass transition temperatures of the cured composition of Examples 5, 7, and 8 were measured by dynamic mechanical analysis using a TA Instruments Q800 Dynamic Mechanical Analysis instrument.

The BF3:amine complex used, the molar ratio of reactive groups of the BF3:amine complex to epoxide groups, the molar ratio of anhydride groups to epoxide groups, the onset temperature of the DSC peak exotherm (° C.), and the minimum glass transition temperature of the cured composition (° C.) are given in Table 2 below for the compositions of Examples 3-8.

TABLE 2

| Ex No. | BF3:amine complex | Molar ratio of BF3:amine complex to epoxide groups | Molar ratio of anhydride groups to epoxide groups | DSC Exotherm Peak Onset Temp (° C.) | T$_g$ (° C.) |
| --- | --- | --- | --- | --- | --- |
| 3 | BF3:benzyl amine | 0.0892 | 0.0263 | 53 | — |
| 4 | BF3:benzyl amine | 0.0892 | 0.0875 | 68 | — |
| 5 | BF3:benzyl amine | 0.0892 | 0.1004 | 51 | 230 |
| 6 | BF3:benzyl amine | 0.0892 | 0.1647 | 48 | — |
| 7 | BF3:benzyl amine | 0.0892 | 0.0674 | 49 | 247 |
| 8 | BF3:isopropyl amine | 0.1229 | 0.1004 | 70 | 225 |

Example 9

The resin composition of Example 9 was made by mixing 75 pbw of a cycloaliphatic epoxy compound (diglycidyl 1,2-cyclohexanedicarboxylate (CY184, Huntsman)) with 9 pbw of a BF$_3$ amine complex (BF3:benzyl amine complex (ANCHOR™ 1040 complex (Air Products)), and 25 pbw of a polymeric anhydride (maleic anhydride functionalized 1,4-cis polybutadiene (POLYVEST™ MA75 (Evonik Industries)), which provided molar ratios for the reactive groups of 0.1153 molar equivalents of the BF$_3$ per molar equivalent of epoxide groups and 0.0799 molar equivalents of the anhydride group per molar equivalent of epoxide groups.

The resin composition of Comparative Example C4 was made by mixing 100 pbw of a cycloaliphatic epoxy compound (diglycidyl 1,2-cyclohexanedicarboxylate (CY184, Huntsman)) with 3 pbw of a BF$_3$ amine complex (BF3: benzyl amine complex (ANCHOR™ 1040 complex (Air Products)), which provided a ratio of 0.0288 molar equivalents of BF$_3$ per molar equivalent of epoxide groups.

Each of the compositions of Example 9 and Comparative Example C4 was cured for 5 min. at 145° C.

Figure 3:
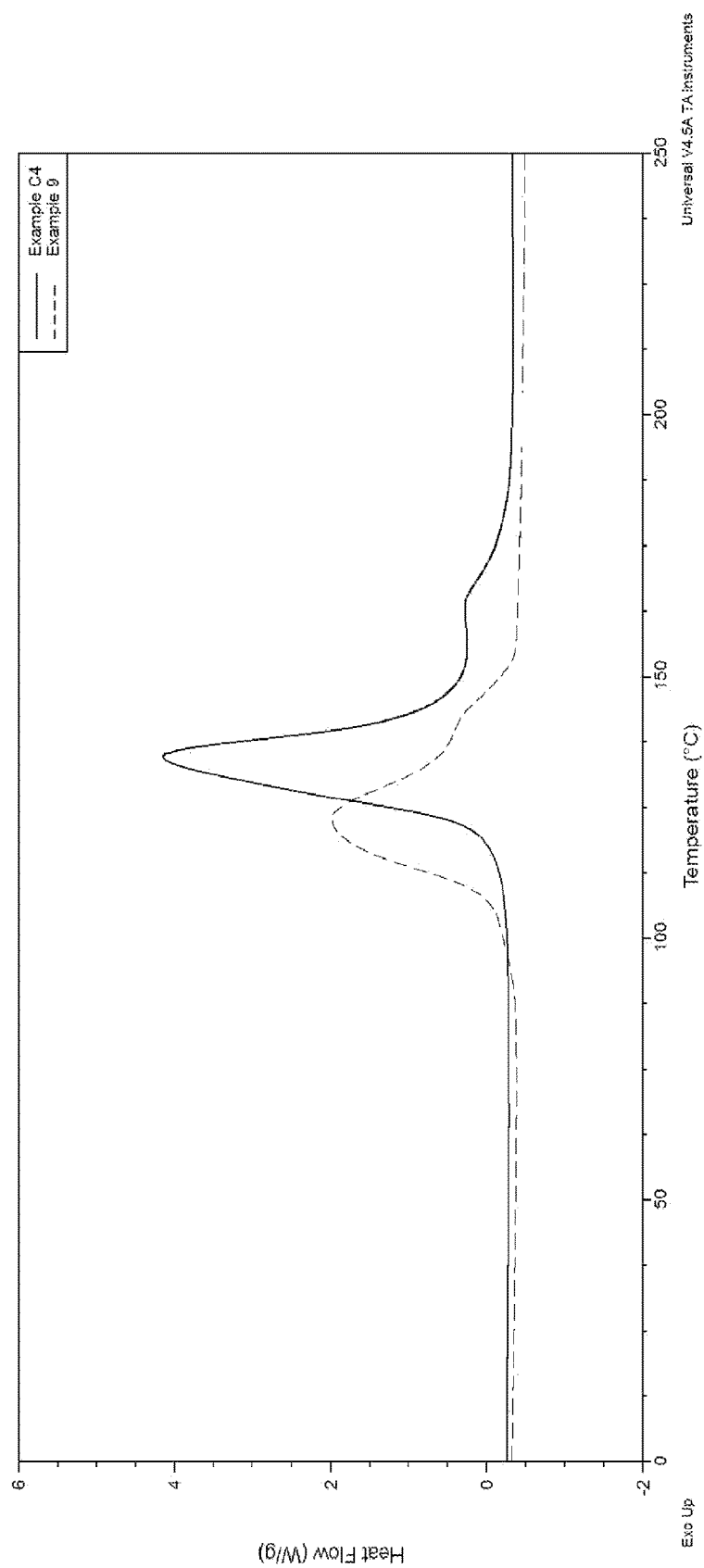
FIG. 3 shows a plot of heat flow (W/g) versus temperature, as measured by differential scanning calorimetry during curing of the resin compositions of Example 9 of the present invention and Comparative Example C4.

The exotherm during cure was measured by DSC using a TA instruments Q2000 at a 10° C./min ramp rate and a plot of the DSC results is shown in FIG. 3 as a plot of heat flow (W/g) versus temperature, as measured during curing of the resin compositions of Example 9 and Comparative Example C4.

The respective glass transition temperatures of the cured compositions of Example 9 and Comparative Example C4 were measured by dynamic mechanical analysis using a TA Instruments Q800 Dynamic Mechanical Analysis instrument.

The molar ratio of reactive groups of the BF3:amine complex to epoxide groups, the molar ratio of anhydride groups to epoxide groups, the onset temperature of the DSC peak exotherm (° C.), and the minimum glass transition temperature of the cured composition (° C.) are given for Example 9 and Comparative Example C4 in Table 3 below.

TABLE 3

| Ex No. | Molar ratio of BF3:amine complex to epoxide groups | Molar ratio of anhydride groups to epoxide groups | DSC Exotherm Peak Onset Temp (° C.) | $T_g$ (° C.) |
|---|---|---|---|---|
| 9 | 0.1153 | 0.0799 | 107 | 66 |
| C4 | 0.0288 | — | 121 | 70 |

Examples 10-15

The resin compositions of Example 11-13 were made by mixing 75 pbw of a cycloaliphatic compound 3',4'-epoxy-cyclohexane)methyl 3,4-epoxycyclohexylearboxylate (CELLOXIDE™ 2021P resin (Daicel Corporation)), 25 pbw of a polymeric anhydride (maleic anhydride functionalized 1,4-cis polybutadiene (POLYVEST™ MA75 (Evonik Industries)), with 9 pbw of a mixture of $BF_3$ amine complex (BF3:benzyl amine complex (ANCHOR™ 1040 complex (Air Products)), and 0.0225, 0.0450, or 0.0900 pbw of an imidazole compound (2-ethyl-4-methyl-1H-Imidazole-1-propanenitrile) which provided molar ratios for the reactive groups of 0.0889, 0.0887, 0.0883 molar equivalents of the $BF_3$ per molar equivalent of epoxide groups respectively and 0.0618 molar equivalents of the anhydride group per molar equivalent of epoxide groups and the amount of imidazole compound indicated in Table 4 below.

The compositions of Examples 14 and 15 were made by mixing 75 pbw of a cycloaliphatic compound 3',4'-epoxy-cyclohexane)methyl 3,4-epoxycyclohexylcarboxylate (CELLOXIDE™ 2021P resin (Daicel Corporation)), 25 pbw of a polymeric anhydride (maleic anhydride functionalized 1,4-cis polybutadiene (POLYVEST™ MA75 (Evonik Industries)), with 9 pbw of a mixture of $BF_3$ amine complex (BF3:benzyl amine complex (ANCHOR™ 1040 complex (Air Products)) and the amount of a tertiary amine (benzyldimethylamine indicated in Table 4 below.

Samples of the compositions of Examples 1, 11, 12, and 13 were each cured at 130° C., 140° C., and 145° C. Samples of the compositions of Examples 14 and 15 were each cured at 145° C.

Figure 4:
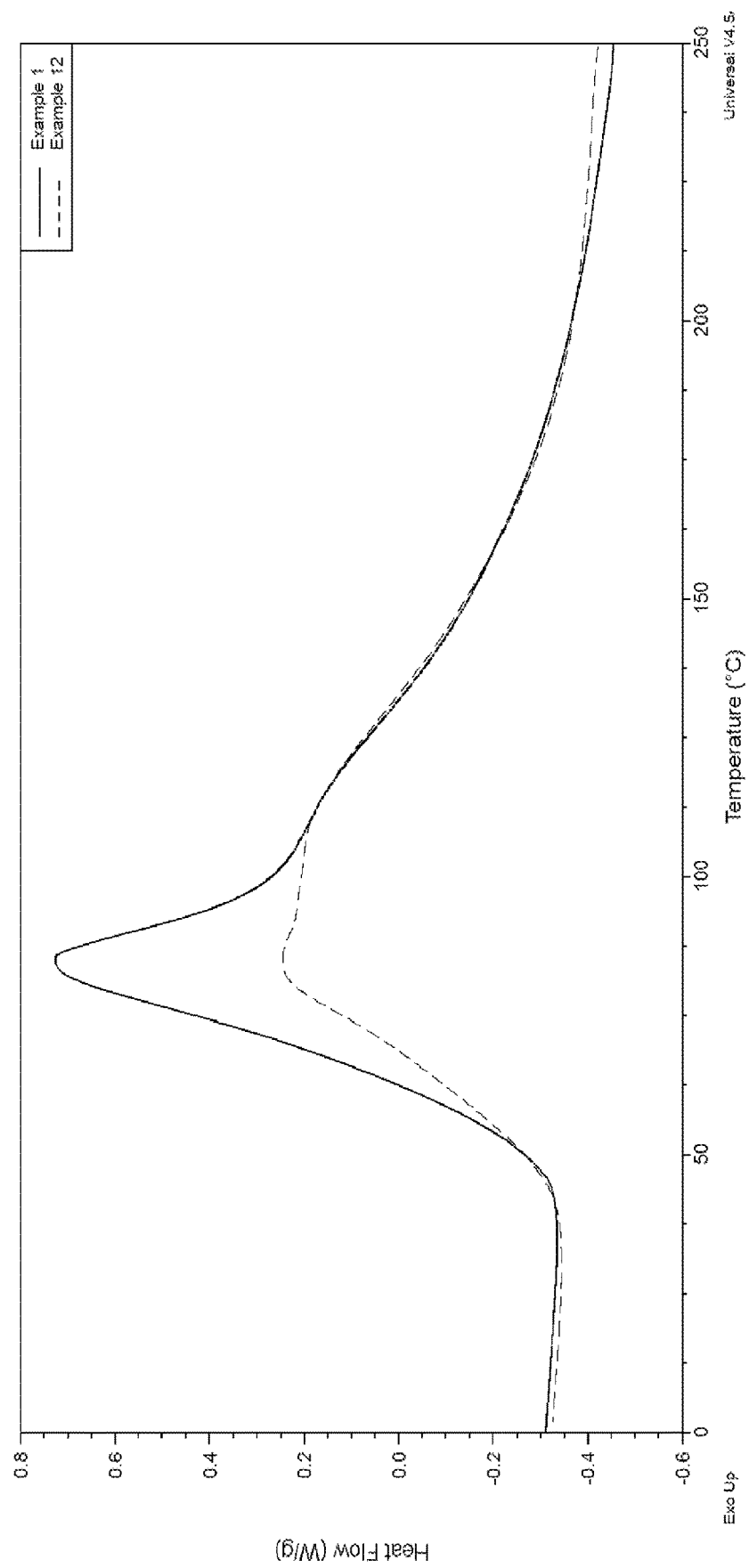
FIG. 4 shows a plot of W/g) versus temperature, as measured by differential scanning calorimetry during curing of the resin compositions of Examples 1 and 12 of the present invention.

The exotherm during cure was measured by DSC using a TA instruments Q2000 at a 10° C./min ramp rate and a plot of the DSC results is shown in FIG. 4 as a plot of W/g) versus temperature, as measured by differential scanning calorimetry during curing of the resin compositions of Examples 1 and 12 of the present invention.

The respective gel times of the compositions of Examples 10-15, as indicated by crossover between the elastic modulus and storage modulus, were measured using a Thermo-Mars 40 rheometer, using 40 mm diameter plate to plate method with a frequency 0.1 Hz, strain of 1 and temperature sweep of 2° C./min from ambient to 150° C.

The respective glass transition temperatures of the cured compositions of Examples 1 and 11 to 15 were measured by dynamic mechanical analysis using a TA Instruments Q800 Dynamic Mechanical Analysis instrument.

The amount of imidazole, gel time at 130° C., 140° C., and 145° C., and glass transition temperature (° C.) for the respective compositions of Examples 1 and 11-15 are set forth in Table 4 below.

TABLE 4

| Ex# | % Imidazole of $BF^3$ complex/ Imidazole blend | % Tertiary amine of $BF^3$ complex/ tertiary amine blend | Gel time (s) | | | Tg (° C.) |
|---|---|---|---|---|---|---|
| | | | 130° C. | 140° C. | 145° C. | |
| 1 | — | — | 16 | 12 | 11 | 235 |
| 11 | 0.25 | — | 25 | 17 | 13 | 264 |
| 12 | 0.50 | — | 34 | 23 | 19 | 292 |
| 13 | 1.00 | — | 140 | 96 | 77 | 70 |
| 14 | — | 1.00 | — | — | 37 | — |
| 15 | — | 3.00 | — | — | 48 | — |

The invention claimed is:

1. A curable resin composition, comprising:
   (a) a curable resin that comprises at least one non-aromatic epoxy compound, at least one non-aromatic oxetane compound, or a mixture thereof, said compounds bearing an amount of molar equivalents of epoxide groups, oxetano groups, or a mixture thereof,
   (b) an amount of one or more curing agents selected from Lewis acid:Lewis base complexes, in a ratio of from 1:25 to 1:2 molar equivalents of Lewis acid:Lewis base complex to molar equivalents of epoxide groups, oxetano groups, or mixture thereof, and
   (c) a cure accelerating amount of one or more anhydride compounds, in a ratio of up to 1:1 of molar equivalents of anhydride groups to molar equivalents of the Lewis acid:Lewis base complex component of the resin composition.

2. The resin composition of claim 1, wherein the resin composition exhibits a cure conversion of greater than or equal to 85% and a glass transition temperature of greater than or equal to 210° C. after curing at a temperature of from 100° C. to 180° C. for a time period of less than or equal to 20 minutes.

3. The composition of claim 1, wherein the composition comprises, based on 100 pbw of the resin composition, from 50 to 80 pbw of one or more non-aromatic epoxy compounds and optionally, an aggregate amount of up to 30 pbw of one or more aromatic epoxy compounds and/or monoepoxide compounds.

4. The composition of claim 1, wherein the anhydride compound is an anhydride polymer or oligomer having a molecular weight of greater than or equal to about 500 g/mole and having one or more anhydride functional group per molecule.

5. The composition of claim 1, wherein the resin composition exhibits an initial cure rate at a temperature of from 100° C. to 180° C., further comprising an amount of a nitrogen base compound effective to slow the initial cure rate.

6. A curable fiber reinforced resin matrix composite material, comprising fibers impregnated with the curable resin composition according to claim 1.

7. A fiber reinforced resin matrix composite article, made by curing the composite material of claim 6.

8. A method for making a curable resin impregnated fiber material, comprising impregnating fibers with a curable resin composition according to claim 1.

9. The method of claim 8, wherein the curable resin composition further comprises one or more thermoplastic polymers that are soluble in the resin composition in an amount effective to increase the viscosity of the resin composition to greater than or equal to 500 Poise, wherein the viscosity of the resin composition in the absence of the thermoplastic polymer is less than or equal to 50 Poise, wherein the step of impregnating the fibers comprises:

blending the thermoplastic polymer with the components of the curable resin composition other than the Lewis acid:Lewis base and anhydride components, at a temperature of from 30° C. to 150° C., adding the Lewis acid:Lewis base and anhydride components to the blended thermoplastic polymer and resin composition, at a temperature of from about 40° C. to 70° C. to form the curable resin composition, extruding the curable resin composition, and impregnating fibers with the curable resin composition by contacting fibers with the extruded curable resin composition.

10. A method for making a fiber reinforced resin matrix composite article, comprising stacking two or more layers of the curable resin composition impregnated fibers of claim 9 and heating the stacked layers to a temperature of from 100° C. to 180° C. for a time period of less than or equal to 20 minutes to cure the curable resin composition and thereby form the fiber reinforced resin matrix composite article.

11. The method of claim 8, wherein when the resin, curing agent, and cure accelerator are initially combined, the curable resin composition exhibits a viscosity of less than or equal to 50 Poise at 40° C., comprising:

impregnating tows of fibers with the curable resin composition, and winding the curable resin composition-impregnated fiber tows around a mandrel to form a filament wound fiber reinforced resin matrix composite material, and allowing the filament wound fiber reinforced resin matrix composite material to react at room temperature for from 4 to 7 hours, so that the curable resin composition exhibits a viscosity of from 50,000 to 300,000 Poise, and removing the filament wound fiber reinforced resin matrix composite material from the mandrel.

12. A method for making a fiber reinforced resin matrix composite article, comprising press molding the filament wound fiber reinforced resin matrix composite material of claim 11 at a temperature of from 100° C. to 180° C. for a time period of less than or equal to 20 minutes to shape the filament wound fiber reinforced resin matrix composite material and cure the curable resin composition and thereby form a fiber reinforced resin matrix composite article.

13. The method of claim 8, wherein when the resin, curing agent, and cure accelerator are initially combined, the curable resin composition exhibits a viscosity of less than or equal to 50 Poise, comprising impregnating a fiber preform with the curable resin composition in a mold.

14. A method for making a fiber reinforced resin matrix composite article, comprising heating the curable resin composition impregnated fiber preform of claim 13 to a temperature of from 100° C. to 180° C. for a time period of less than or equal to 20 minutes to cure the curable resin composition and thereby form a fiber reinforced resin matrix composite article.

15. A method accelerating the cure of a curable resin composition, comprising adding a cure accelerating amount of one or more anhydride compounds to a curable resin composition comprising a curable resin that comprises at least one non-aromatic epoxy compound, at least one non-aromatic oxetane compound, or a mixture thereof and a curing agent that comprises one or more Lewis acid-base complexes.

16. A method toughening a resin composition, comprising adding a cure accelerating amount of one or more polymeric anhydride compounds to a curable resin composition that comprises a curable resin that comprises at least one non-aromatic epoxy compound, at least one non-aromatic oxetane compound, or a mixture thereof, and a curing agent that comprises one or more Lewis acid-base complexes, in the substantial absence of any other polymeric toughening agent.

17. The method of claim 16, wherein the resin composition exhibits, after curing at a temperature of from 100° C. to 180° C. for a time period of less than or equal to 20 minutes, a fracture toughness of greater than or equal to 0.3 MPa·m$^{1/2}$, as measured by notched impact testing according to ASTM D-5045-99.

18. A curable resin composition, comprising:

(a) a curable resin, comprising at least one non-aromatic epoxy compound that comprises at least one epoxide group per molecule of such compound, at least one non-aromatic oxetane compound that comprises at least one oxetano group per molecule of such compound, or a mixture of such compounds, (b) one or more curing agents selected from Lewis acid:Lewis base complexes, in an amount of from 1 to 20 parts by weight of the one or more curing agents per 100 parts by weight of the resin composition, and (c) one or more anhydride compounds, each comprising at least one anhydride group per molecule of such compound, in a cure accelerating amount of less than 0.5 molar equivalents of anhydride groups per molar equivalents of epoxide groups, oxetane groups, or mixture thereof.

19. A curable resin composition, comprising:

(a) a curable resin that comprises at least one non-aromatic epoxy compound, at least one non-aromatic oxetane compound, or a mixture thereof, (b) one or more curing agents selected from Lewis acid:Lewis base complexes, and (c) a cure accelerating amount of one or more anhydride polymer or oligomer having a molecular weight of greater than or equal to about 500 g/mole and having one or more anhydride functional group per molecule.

20. The curable resin composition of claim 19, wherein:

the at least one non-aromatic epoxy compound comprises at least one epoxide group per molecule of such compound, the at least one non-aromatic oxetane compound comprises at least one oxetano group per molecule of such compound, the one or more anhydride polymer or oligomer each comprise at least one anhydride group per molecule of such compounds and the resin composition comprises:

the one or more curing agents is present in an amount of from 1 to 20 parts by weight of the one or more curing agents per 100 parts by weight of the resin composition, and the one or more anhydride polymer or oligomer is present in a cure accelerating amount of less than 0.5 molar equivalents of anhydride groups per molar equivalents of epoxide groups, oxetane groups, or mixture thereof.

* * * * *